(12) United States Patent
Winters

(10) Patent No.: US 6,328,080 B1
(45) Date of Patent: Dec. 11, 2001

(54) WOVEN SLEEVE WITH INTEGRAL MONOFILAMENT FASTENERS

(75) Inventor: Danny E. Winters, Downingtown, PA (US)

(73) Assignee: Federal-Mogul Systems Protection Group, Inc., Exton, PA (US)

( * ) Notice: Subject to any disclaimer, the term of this patent is extended or adjusted under 35 U.S.C. 154(b) by 0 days.

(21) Appl. No.: 09/671,430

(22) Filed: Sep. 27, 2000

(51) Int. Cl.[7] ............................. F16L 11/02; B32B 23/02; D03D 27/00; H02G 3/04
(52) U.S. Cl. ...................... 139/388; 428/36.1; 428/100; 428/193; 138/168; 439/892; 174/36; 2/917
(58) Field of Search .................. 428/36.1, 36.3, 428/23, 100, 192, 193; 138/168, 103; 439/135, 142, 367, 892; 174/36, DIG. 11; 139/388; 2/917

(56) References Cited

U.S. PATENT DOCUMENTS

| | | |
|---|---|---|
| 3,413,406 | 11/1968 | Plummer . |
| 3,461,513 | 8/1969 | Girard et al. . |
| 4,281,211 | 7/1981 | Tatum et al. . |
| 4,371,578 | 2/1983 | Thompson . |
| 4,652,263 * | 3/1987 | Herweck et al. ..................... 139/421 |
| 4,684,762 | 8/1987 | Gladfelter . |
| 4,784,886 | 11/1988 | Monget et al. . |
| 4,791,236 * | 12/1988 | Klein et al. ............................. 174/36 |
| 4,891,256 | 1/1990 | Kite, III et al. . |
| 4,920,235 * | 4/1990 | Yamaguchi ............................ 174/36 |
| 5,178,923 * | 1/1993 | Andrieu et al. ..................... 428/36.1 |
| 5,300,337 * | 4/1994 | Andrieu et al. ..................... 428/36.1 |
| 5,901,756 * | 5/1999 | Goodrich ............................. 138/167 |

\* cited by examiner

*Primary Examiner*—Andy Falik
(74) *Attorney, Agent, or Firm*—Synnestvedt & Lechner LLP

(57) ABSTRACT

A woven sleeve is used for bundling elongated substrates. The illustrative embodiment is interwoven of monofilament warp members and fill yarns comprised of compliant material such as bulky multifilament yarn. Supplement monofilaments extending lengthwise of the fabric are separated into individual pieces, each including a section cradled in the compliant material of a fill yarn and are locked in the cradle position by at least one of the warp members. End sections of the individual pieces project outwardly and terminate in hooks which interlock with an exposed section of the compliant material to effect closure of the sleeve around the elongated substrates. A sleeve of the type described may also be provide with integral hooks to attach the sleeve to loop-type other loop material on a support surface.

17 Claims, 3 Drawing Sheets

FIG.2
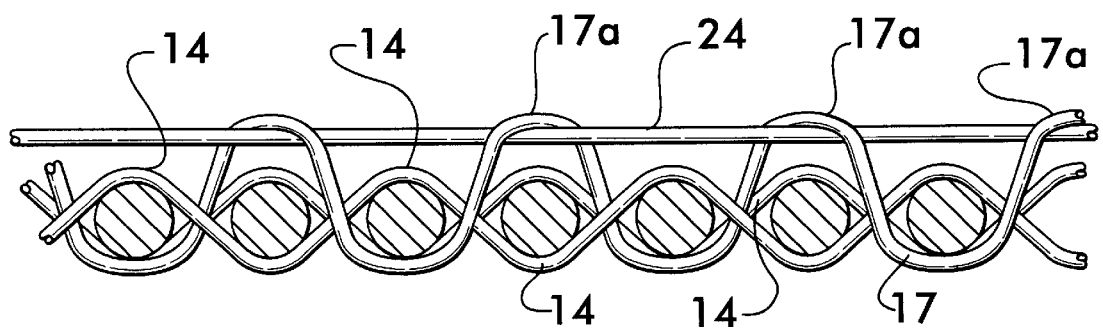
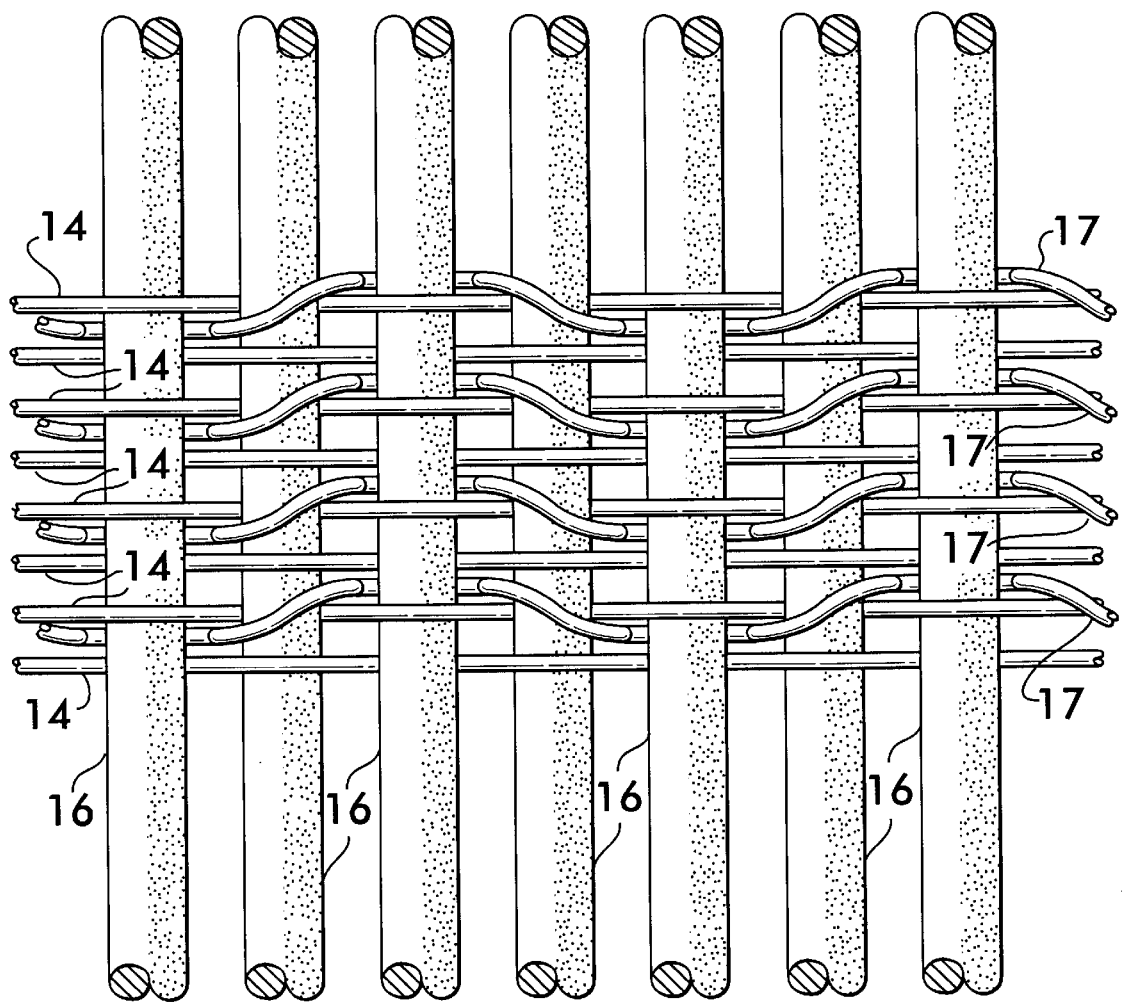
FIG.3

FIG.4
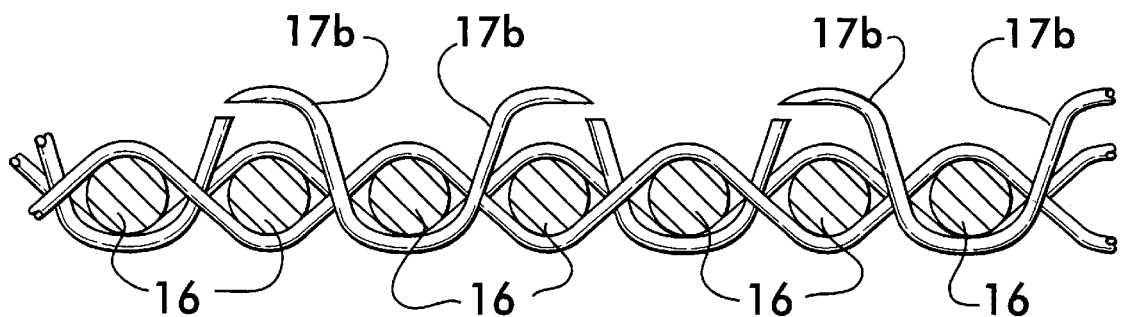
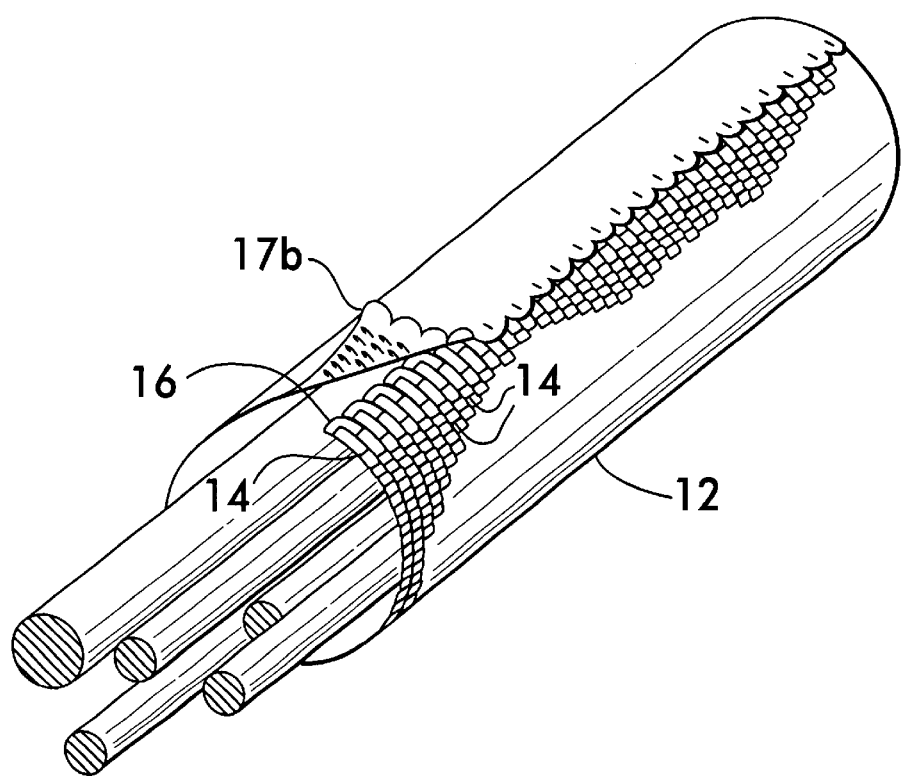
FIG.5

WOVEN SLEEVE WITH INTEGRAL MONOFILAMENT FASTENERS

FIELD OF THE INVENTION

This invention relates to woven fabric and, while not limited thereto, is particularly directed to sleeving for the protection of elongated items, such as pipes, tubes and electrical conductors. The invention is especially directed to sleeves using weaving techniques for the integral incorporation of fastening means of the hook-and-loop type.

BACKGROUND OF THE INVENTION

The use of flexible sleeves in the form of woven, braided or knitted webs comprised of monofilament and multifilament yarns for the protection of cables, hoses and the like has become well known in the art. In a typical form of sleeve of this kind, lengthwise extending regions of the sleeving material are provided with interengagable fasteners which are joined together for the purpose of holding the sleeve in its wrap-around configuration. Sleeves manufactured by the Federal-Mogul Systems Protection Group, Inc. are known, which are provided with a multiplicity of hook-and-loop fastener elements arranged in bands which are typically positioned along opposed marginal edges. The hook-type fasteners are formed on woven fabric tapes which are adhesively secured or stitched to the flexible webbing constituting a sleeve. The loop material may also be provided in tape form or may constitute a bulky multifilament fill yarn which has loop-like portions exposed in bands. The filaments of the yarn can be interengaged with the hooks to effect a closure of the sleeve. These sleeves have gained wide acceptance in the art due to their convenience of use, their relatively low cost and because they conveniently allow for cable breakouts at points where an encased cable is required to be connected to a selected instrument or to an item of equipment in a vehicle.

Despite the wide acceptance of the currently available sleeving, a need exists for the application of durable, interengagable hook-and-loop closures in a manner which decreases manufacturing costs and has an equal or superior closure strength as compared to the prior art, having the capability of resisting separation in the absence of the deliberate application of a relatively high separation force.

SUMMARY AND OBJECTS OF THE INVENTION

According to the invention, a woven web of sleeving material is comprised of monofilament warps and bulky high denier yarns or other highly compliant yarns as the fill yarns. The sleeve is woven with a band or zone comprising a multiplicity of rows of supplemental warps. Each supplemental warp is woven in a leno weave with an adjacent warp. Periodic loops are formed which project from the surface of the web. These are severed and formed into hooks. The end portions of the supplemental warps are captured and locked in place between the ground warps and the highly compliant fill yarns. To maximize the holding force applied to the hooks, the density of the warps within the zone is quite high. Preferably, the ground warps and supplemental warps are packed so that they touch each other in the zones. To maximize flexibility, a plain weave which is significantly less dense than the weave in the zones may be used for the remainder of the sleeve. This is accomplished by use of fewer warps per inch outside of any zone having integral hooks.

Although bi-component or other compliant yarns may be employed in the fill, a preferred embodiment comprises the use of bulk yarns, especially bulky multifilament yarns as the fill yarns. Such yarns are considered to be as defined in ASTM "Standards on Textile Materials", Part 33, page 14, 1979 under the general heading "Bulk Yarn" and may include the yarns specifically defined therein as bulky yarn and textured yarn. An important aspect of the use of compliant yarns is that they yield sufficiently to cradle the supplemental warp yarns, forming pockets which capture them in position at the points of crossing with the ground warps. The arrangement has the advantage of providing integrally woven hooks while eliminating any need for the application of an adhesive binder to secure them in place. The construction has the added advantage of elimination of a tendency of the woven web to curl in the lengthwise direction of the woven web as sometimes occurs when the hooks are bound in place.

When bulky yarn is used as the compliant fill yarn, the multifilaments may be exposed in bands which preferably extend in lengthwise zones along the opposite marginal edge of the sleeve or in bands at other locations extending lengthwise of the fabric. The filaments of the exposed yarn are preferably separated as by napping, so as to form loops of fiber which interlock with the hooks when the web is wrapped around the elongated substrates to be protected and the hooks are pressed into the mass of separated filaments.

The hooks are confined to a multiplicity of rows in one or more zones extending lengthwise of the woven web. In a preferred embodiment, the hooks extend along one marginal edge of the web with the loops along the opposite marginal edge. Optionally or additionally, longitudinally extending zones with integral hooks may be spaced inwardly from a marginal edge. Similarly, multifilament yarns exposed to provide engageable loops in one or more zones spaced inwardly from the opposite marginal edge may be provided. Either arrangement provides adjustably by providing for snug fitting of the sleeve around bundles of substrates of various numbers or sizes.

In preferred forms of the invention, it has been found that the supplemental warp monofilaments should be of large diameter. Preferably, the diameter of the warp and the supplemental warp monofilament is in the range of between about 0.008 and about 0.012 inches. Furthermore, it is preferred that where the compliant yarn is a bulky multifilament yarn, it should have a denier of between about 700 and about 1300. The woven product should have a pick density of between about 11 and 19 picks per inch.

Selection of supplemental warp monofilaments and bulky multifilament fill yarns within the ranges above specified has the advantage that the supplemental monofilaments are more readily and tightly captured between the warp monofilaments and the fill yarns. The compliant fill yarn compresses, at its point of contact with the supplemental monofilaments, filling any space surrounding them and preventing slippage when the hooks and loops are pulled apart. Equal or greater closure strength is achieved as compared with commercially available hook-and-loop tape products, even though the density of the hooks is materially lower. This advantage is achieved without the need for an application of a binder to bind the hook elements to the woven web, thereby eliminating a costly and time-consuming step in the process of making the product. When taken together, the use of warp monofilaments and compliant fill yarns achieves an important objective of the invention, namely, a sleeve having integral hook-and-loop closure means with superior closure strength.

The foregoing and as well as other inherent objects and advantages of the invention will become apparent from the following detailed description of the illustrative embodiment of the invention.

Woven webs having the properties necessary for carrying out the objectives of the invention typically are woven in a plain weave pattern utilizing monofilaments in the warp direction and compliant yarns in the fill. The compliant yarns may be bulk yarns, as defined above and may include bi-component yarns. Bi-component yarns include DREF-spun yarns which may comprise a wire or heat settable monofilament core with a sheath comprised of glass fibers or other compliant fibrous material. Warp monofilaments may be wire or selected from polymeric materials within the category known as "engineered plastics materials" or a combination of the two. Bi-component monofilaments having a core of relatively stiff polymeric material and a sheath of a compliant material may be used as the warp monofilaments or may even be used in the fill. The supplemental warp monofilaments may be resilient wire, although heat settable polymeric materials, such as nylon, polyester or the like, are particularly preferred.

BRIEF DESCRIPTION OF THE DRAWINGS

FIG. 2 is a schematic view illustrating a step in the formation of the integrally formed hooks;

FIGS. 3 and 4 are schematic fragmentary plan and sectional views of a fabric illustrating the incorporation of integrally formed hooks; and FIG. 5 is a schematic view of a sleeve incorporating the principles of the present invention.

DETAILED DESCRIPTION OF THE PREFERRED EMBODIMENT

Figure 1:
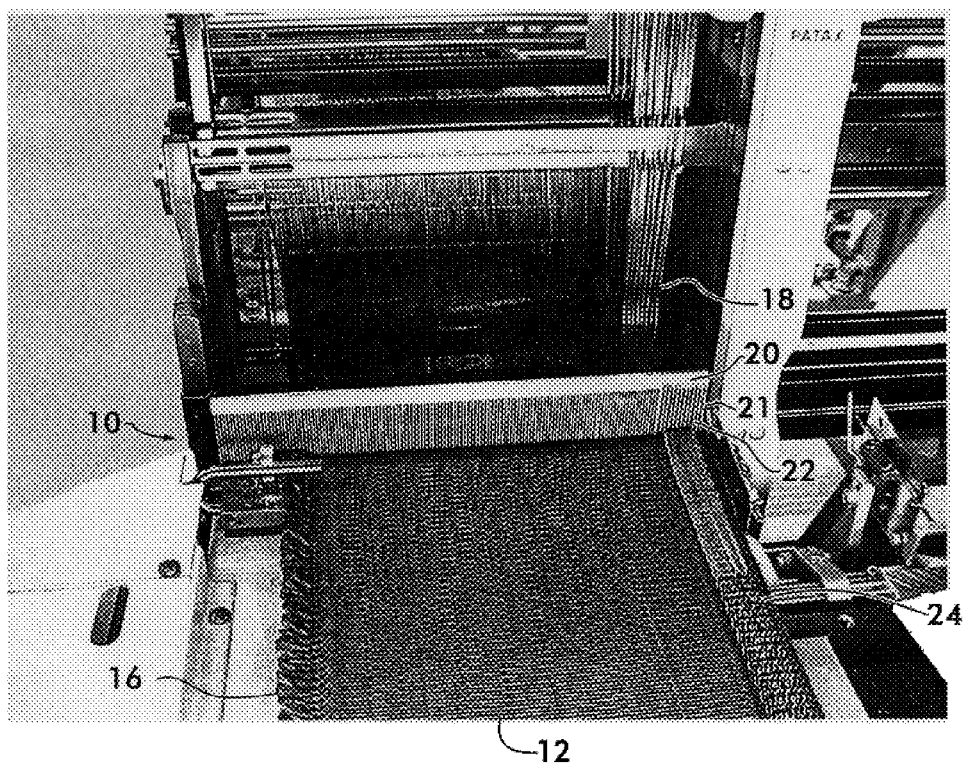
FIG. 1 is a view of a standard loom modified to produce products according to the invention.

With reference first to FIG. 1, a conventional loom 10 is shown for weaving a web 12 used in the manufacture of sleeves of the present invention. The web is preferably comprised of monofilament warps 14 having a diameter of about 0.010 inches and a compliant yarn which, for purposes of the manufacture of products illustrated, is a bulky monofilament yarn 16 formed of nylon. A suitable bulky filament polyester yarn is a 900 denier Ansotex yarn, 970-136-00-IR-IR79 manufactured by Honeywell of Petersburg, Va.

The loom 10 is equipped with conventional leno heddles 18 which are positionable with respect to the fabric in the region where the rows of hooks are to be formed. As illustrated, the leno heddles 18 are located at one side of the loom along one marginal edge of fabric web 12. The loom 10 further includes a reed 20 having a separate section 21 with dents 22 spaced to receive lancets 24 positioned over the plane of the fabric of sleeve 12.

In the illustrative embodiment of the invention, the dents 22 of section 21 are each made wide enough to receive two lancets 24 and provide clearance for eight ground warps and two supplemental warps. The lancets 24 extend behind the dents 22 between the leno heddles 18.

Each leno heddle 18 guides a supplemental warp 17 through a thread guide, not shown. As is understood by those skilled in the art, during the weaving process, the leno heddles 18 raise the supplemental warps, shift them laterally to cross a ground warp and a lancet 24 before moving downwardly and returning to the starting position, thus, forming a loop 17a over the lancet. In forming the fabric according to the invention, the leno heddles are set up to form a loop over every second or third fill yarn. The positioning of a lancet 24 relative to the fabric sleeve being formed is schematically shown in FIG. 2 with the loops shown at 17a.

A portion of the fabric containing integral hooks is shown schematically in plan view in FIGS. 3 and 4. The loops in the supplemental monofilaments are subsequently set by the application of heat and cut to form projecting hooks as shown at 17b in FIG. 4. Preferably, the hooks are formed at opposite ends of adjacent loops 17a. The supplemental monofilaments are, thus, separated into segments each having a middle portion captured between a compliant fill yarn 16 and the adjacent ground warps 14 with the hooks of each segment preferably facing in opposite directions. If desired, a number of spaced zones each containing a multiplicity of rows of hooks may be integrated into the fabric by adding additional supplemental warps and leno heddles at the fabric positions where hooks are desired. It is generally preferred, although not necessary to the invention, that at least one band or zone having rows of hooks be spaced along a marginal edge of the sleeve.

In forming a sleeve having integral hooks according to the invention, in order to lock the hooks into the fabric between the compliant fill yarns and the monofilaments, it is important that the fabric be relatively tightly woven in regions where the hooks are to be incorporated. For this purpose, it has been found that compliant fill yarns having a denier of 700 to 1300 are woven with a pick density of about 11 to 19 picks per inch, although for some products, the pick count may be increased to as much as 28 without departure from the scope of the invention. A few field trials will generally determine the selection of a compliant yarn having sufficient compliance for a particular product application. A density of about 16 picks per inch of bulky yarn of a denier of 900 was used in the illustrative product and has been found to produce excellent results. In the sleeve of this example, about 80 warp yarns per inch each having a diameter of about 0.008 inches were employed in a zone in which the hooks are formed. Hook monofilaments having a diameter of about 0.008 to about 0.012 inches may be formed in side-by-side rows, although an alternating pattern whereby the hooks in a first row are offset by one pick from the hooks in the second row will maximize the interengagement of the hooks with the bulky fill yarn.

The balance of sleeve 12 is woven with the supplemental monofilaments omitted. About ½ the number of warp monofilaments are preferably provided in this section, imparting flexibility and a relatively open construction.

As shown in FIGS. 1 and 5, bulky monofilament yarn is exposed along an edge of the sleeve opposite to the edge having the band of hooks. If desired, the bulky monofilament yarn may be napped or otherwise treated to effect a separation of the filaments and draw them out into loops which are engageable and interlock with the hooks running along the opposite fabric edge when the hooks and loops are pressed together. Additional zones of exposure of the bulky fill yarn may be created inwardly from the edge by eliminating warp yarns as required to effect the exposure in such zones. A sleeve formed in accordance with the invention having exposed multifilaments along one edge and integral hooks along the edge is shown in FIG. 5. In addition to the overlapping form of closure shown in FIG. 5, the inner surface of the bulky yarns may be utilized to effect a closure with the integral hooks so that the sleeve assumes a tear-drop cross-sectional appearance if desired.

The techniques described herein may also have utility in the manufacture of sleeving of the types shown in U.S. Pat.

Nos. 5,413,149 and 6,045,884. In the manufacture of products according to these patents, resiliently settable fill monofilaments are employed and are resiliently set. The resiliently settable filaments bias a split sleeve to the closed position. According to the '149 patent, the resiliently set filaments additionally impart kink-resistance to a sleeve. In a modification of such sleeves to provide for integral hooks, the compliant yarn may be a bi-component yarn having an inner core of a heat settable monofilament material with an outer layer of compliant material. Such yarns having either a wire core or a resiliently settable polymeric core with a compliant filamentary sheath are available in the art. The yarns may be DREF process yarns in which a filamentary sheath imparts the necessary compliance to achieve a locking of the supplemental monofilaments between the filamentary sheath of the DREF process yarns and the warp monofilaments. Bi-component yarns having a thermoplastic monofilament core with a compliant outer polymeric sheath of polyester or other resilient material are available from Johns Manville Corporation of Spartanburg, S.C. In addition, biasing to the closed position may be achieved in such products by the incorporation of resiliently settable monofilaments in the fill together with the bulky multifilament or other compliant yarns.

In a further embodiment of the invention, a tubular sleeve was woven which incorporated integral hooks in a zone in which the hooks project outwardly from the surface of the fabric. In this example, the hooks may be used to locate the sleeve in a fixed position, for example, on a surface in the engine compartment of a vehicle, by interengagement with loop tape of conventional form or with a tape comprised of exposed sections of napped bulky multifilament yarn affixed, for example, to the fire wall of the engine compartment or to an interior surface of a door panel.

In summary, in each of the embodiments of the invention, integral fastening hooks are formed in woven fabric materials useful, for example, as sleeving for bundling cables or tubing in automobiles, aircraft or other types of machinery. The integral hooks are locked in place within the fabric structure by the use of compliant fill yarns which yield and cradle a section of the hook monofilament and effect an interlocking of it with the adjacent warp monofilaments. The invention eliminates the need for processing steps such as stitching hook-type tape material to the fabric and/or the use of adhesive coatings to prevent separation of the segments of hook material from the fabric. The principles of the invention may be used for the closure of split-type tubular sleeves, as well as the attachment of sleeving to fixed surfaces, thereby reducing the danger of abrasion caused by contact with moving machinery parts and also reducing noise caused by vibration.

What is claimed is:

1. A woven sleeve for bundling elongated substrates, said sleeve being comprised of interwoven monofilaments and yarns comprised of compliant material;
   a plurality of rows of supplemental monofilaments disposed in a first zone extending lengthwise of said sleeve;
   each said supplemental monofilament being divided into a plurality of separated segments disposed in each row, each having a section cradled in the compliant material and locked in said cradled position by at least one of said interwoven monofilaments, each said segment having an end section projecting outwardly from said sleeve and terminating in a bent over hook shaped portion.

2. A woven sleeve according to claim 1, wherein said interwoven monofilaments and said supplemental monofilaments extend in the warp direction and said yarn comprised of compliant material is the fill yarn.

3. A woven sleeve according to claim 2, wherein said fill yarn is exposed in a second zone spaced from and substantially parallel to said first zone, the compliant material being comprised of fiber loops interengagable with said hooks to effect a closure of said sleeve around said elongated substrates.

4. A woven sleeve according to claim 2, wherein said fill yarn is a bulky yarn having a denier of about 700 to about 1300.

5. A woven sleeve according to claim 4, wherein said bulky yarn has a denier of about 970.

6. A woven sleeve according to claim 2, wherein said supplemental monofilaments have a diameter of between about 0.008 and about 0.012 inches.

7. A woven sleeve according to claim 6, the fill yarn having a density of about 11 to about 19 picks per inch and a denier of about 700 to about 1300.

8. A woven sleeve according to claim 2, wherein said supplemental monofilaments are comprised of resilient metal wire.

9. A woven sleeve according to claim 2, wherein said fill yarn is comprised of a bi-component yarn having a resiliently settable core material and a compliant sheath, wherein said core material is set to form resilient hoops.

10. A woven sleeve according to claim 9, wherein said compliant sheath is a resilient polymeric material.

11. A woven sleeve according to claim 2, wherein said fill yarn further comprises resiliently settable monofilaments.

12. A woven sleeve according to claim 2, wherein said fill yarn comprises a bulky multifilament yarn, said fill yarn being exposed in a second zone extended lengthwise of the sleeve, the multifilament exposed yarns in said second zone forming projecting loops extending from the sleeve surface, said projecting hooks being interconnectable with said loops to effect a closure of said sleeve around said elongated substrates.

13. A woven sleeve according to claim 12, wherein said bulky multifilament yarns have a denier of from about 700 to about 1300, there being about 11 to about 19 picks per inch and wherein the supplemental monofilaments have a diameter between about 0.008 to about 0.012 inches.

14. A woven sleeve according to claim 2, wherein said monofilament warps comprise bi-component monofilaments comprised of a compliant sheath and a relatively stiff core.

15. A woven sleeve according to claim 2, wherein said separate segments of said supplemental monofilaments each have spaced end sections each projecting outwardly from said sleeve and terminating in bent-over, hook-shaped portions, and wherein said cradled portion is intermediate said end sections and is locked in position by the compliant material and at least one of said warp monofilaments.

16. A woven sleeve according to claim 2, wherein said bent over hook-shaped portions face in opposite directions to each other.

17. A woven sleeve according to claim 3, wherein said first and second zones are positioned adjacent parallel side edges of said sleeve.

\* \* \* \* \*